(12) United States Patent
Mitani (10) Patent No.: US 10,401,588 B2
(45) Date of Patent: Sep. 3, 2019

(54) LENS BARREL (71) Applicant: KONICA MINOLTA, INC., Chiyoda-ku (JP)

(72) Inventor: Yoshifumi Mitani, Osaka (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/971,549

(22) Filed: Dec. 16, 2015

(65) Prior Publication Data
US 2016/0170169 A1 Jun. 16, 2016

(30) Foreign Application Priority Data

Dec. 16, 2014 (JP) ................. 2014-254084

(51) Int. Cl.
*G02B 7/02* (2006.01)
*G02B 7/08* (2006.01)

(52) U.S. Cl.
CPC ............ *G02B 7/021* (2013.01); *G02B 7/08* (2013.01)

(58) Field of Classification Search
CPC .......... G02B 7/023; G02B 7/025; G02B 7/04; G03B 17/14
USPC .................................. 359/822–826
See application file for complete search history.

(56) References Cited

U.S. PATENT DOCUMENTS

| 5,523,892 | A * | 6/1996 | Yoshibe | G02B 7/02 359/694 |
| 7,092,171 | B2 * | 8/2006 | Kawaguchi | G02B 7/00 359/702 |
| 2002/0071190 | A1 * | 6/2002 | Wada | G02B 7/021 359/819 |
| 2006/0001986 | A1 * | 1/2006 | Itohiya | G02B 7/023 359/819 |
| 2006/0245089 | A1 * | 11/2006 | Lee | G02B 7/022 359/826 |
| 2011/0317062 | A1 * | 12/2011 | Fujino | G02B 7/02 348/360 |
| 2013/0155531 | A1 * | 6/2013 | Mitani | G02B 7/04 359/823 |

FOREIGN PATENT DOCUMENTS

| JP | 07-168075 | 7/1995 |
| JP | 08-54255 | 2/1996 |
| JP | 08-334669 | 12/1996 |
| JP | 09-297256 | 11/1997 |
| JP | 2000-056202 | 2/2000 |
| JP | 2002-72274 | 3/2002 |
| JP | 2007-148021 | 6/2007 |
| JP | 2011-158725 | 8/2011 |
| JP | 2014-006406 | 1/2014 |

OTHER PUBLICATIONS

Office Action dated Jun. 26, 2018 which issued in the corresponding Japanese Patent Application No. 2014-254084.

* cited by examiner

*Primary Examiner* — Joseph P Martinez
*Assistant Examiner* — Vipin Patel
(74) *Attorney, Agent, or Firm* — Cozen O'Connor (57) ABSTRACT

A lens barrel includes a tubular first fixing cylinder holding a lens group having one or more lenses, and a tubular second fixing cylinder fixedly coupled to one axial end part of the first fixing cylinder so that an axial direction thereof extends along that of the first fixing cylinder, and the second fixing cylinder is made of synthetic resin.

7 Claims, 5 Drawing Sheets

LENS BARREL

TECHNICAL FIELD

The present invention relates to a lens barrel.

BACKGROUND ART

In recent years, a combination of high performance, small size and light weight has been required with an increase in required specifications for lens barrels. Conventionally, a constituent member of a lens barrel, e.g. a tubular fixing cylinder for holding one or more lens groups is mounted with another constituent member in many cases and formed of a metal material little subject to distortion in many cases. However, in the case of forming a fixing cylinder of a metal material, it is difficult to realize the fixing cylinder having a complicated shape during molding and, thus, it is separately necessary to process a mounting portion to which the other constituent member is to be mounted and it is not easy to form the fixing cylinder. If the mounting portion of the fixing cylinder is processed, the other constituent member is displaced from a predetermined position due to a processing error or the like in many cases and it becomes difficult to ensure high performance. Further, if the fixing cylinder is formed of the metal material, a product itself has a heavy weight and becomes expensive.

On the other hand, a fixing cylinder in a lens barrel bisected into a first fixing cylinder and a second fixing cylinder is disclosed, for example, in Japanese Unexamined Patent Publication No. 2002-72274 (literature 1). A technology disclosed in this literature 1 enables easy wiring from a board in a blur correction device, easy confirmation of an operation check of the blur correction device and the like.

However, since the fixing cylinder is merely bisected into the first and second fixing cylinders in the literature 1, the aforementioned problem arises, i.e. it is necessary to separately process a mounting portion and another constituent member is displaced from a predetermined position due to a processing error or the like in processing the mounting portion of the fixing cylinder in many cases. Further, if the first and second fixing cylinders are formed of a metal material, a product itself has a heavy weight and becomes expensive.

SUMMARY OF INVENTION

The present invention was developed in view of the above situation and aims to provide a lens barrel easily formed and capable of realizing high performance and light weight.

A lens barrel according to the present invention includes a tubular first fixing cylinder holding a lens group having one or more lenses, and a tubular second fixing cylinder fixedly coupled to one axial end part of the first fixing cylinder so that an axial direction thereof extends along that of the first fixing cylinder, and the second fixing cylinder is made of synthetic resin. Such a lens barrel is easily formed, has high performance and can be reduced in weight.

These and other objects, features and advantages of the present invention will become more apparent upon reading the following detailed description along with the accompanying drawings.

DESCRIPTION OF EMBODIMENT

Hereinafter, one embodiment according to the present invention is described based on the drawings. Note that parts denoted by the same reference signs in the respective drawings are the same parts and the description thereof is omitted as appropriate. In this specification, parts are denoted by reference signs without suffixes when being collectively called while being denoted by reference signs with suffixes when being individually denoted.

Figure 1:
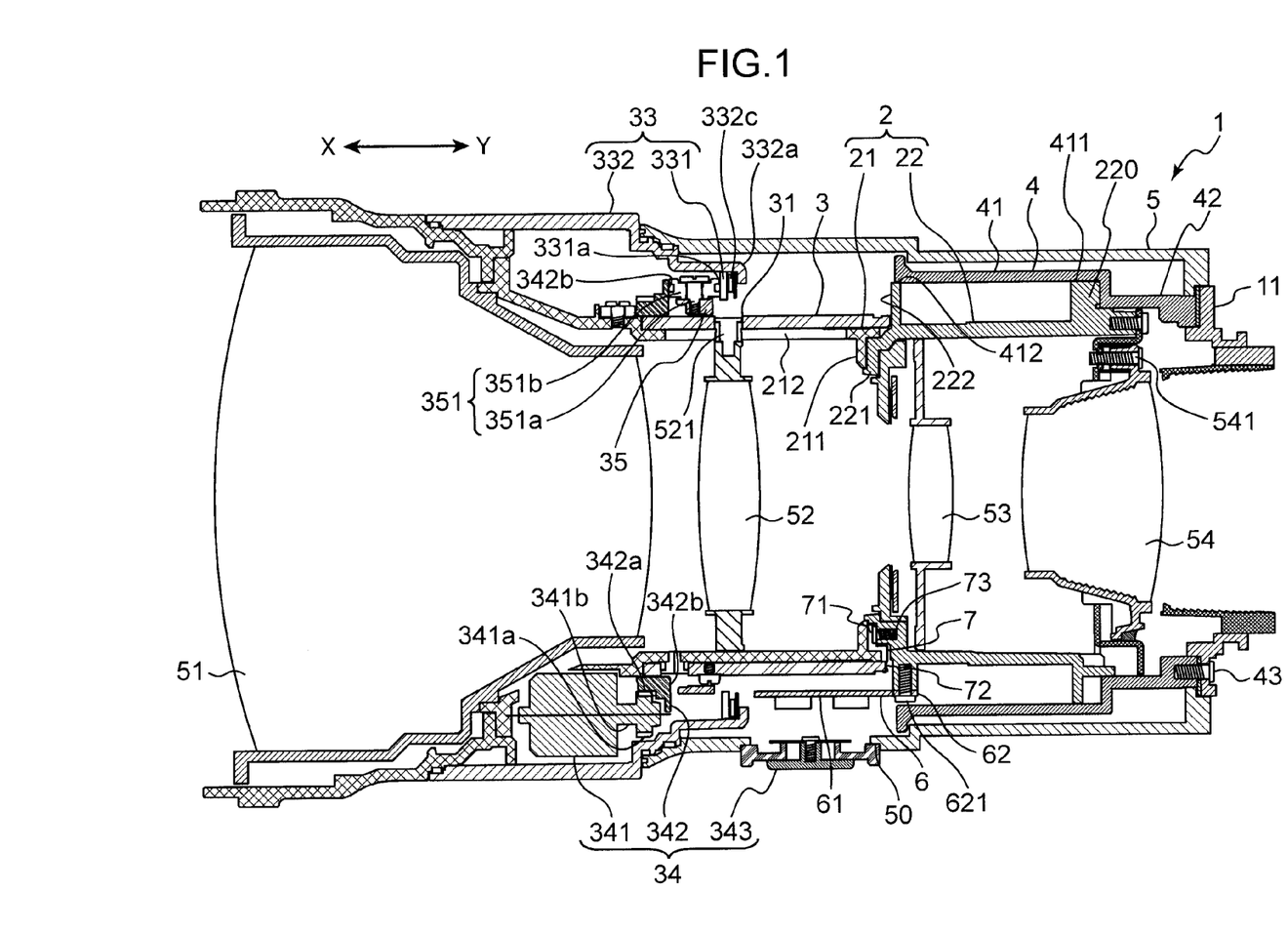
FIG. 1 is a sectional view of a lens barrel in one embodiment.
Figure 2:
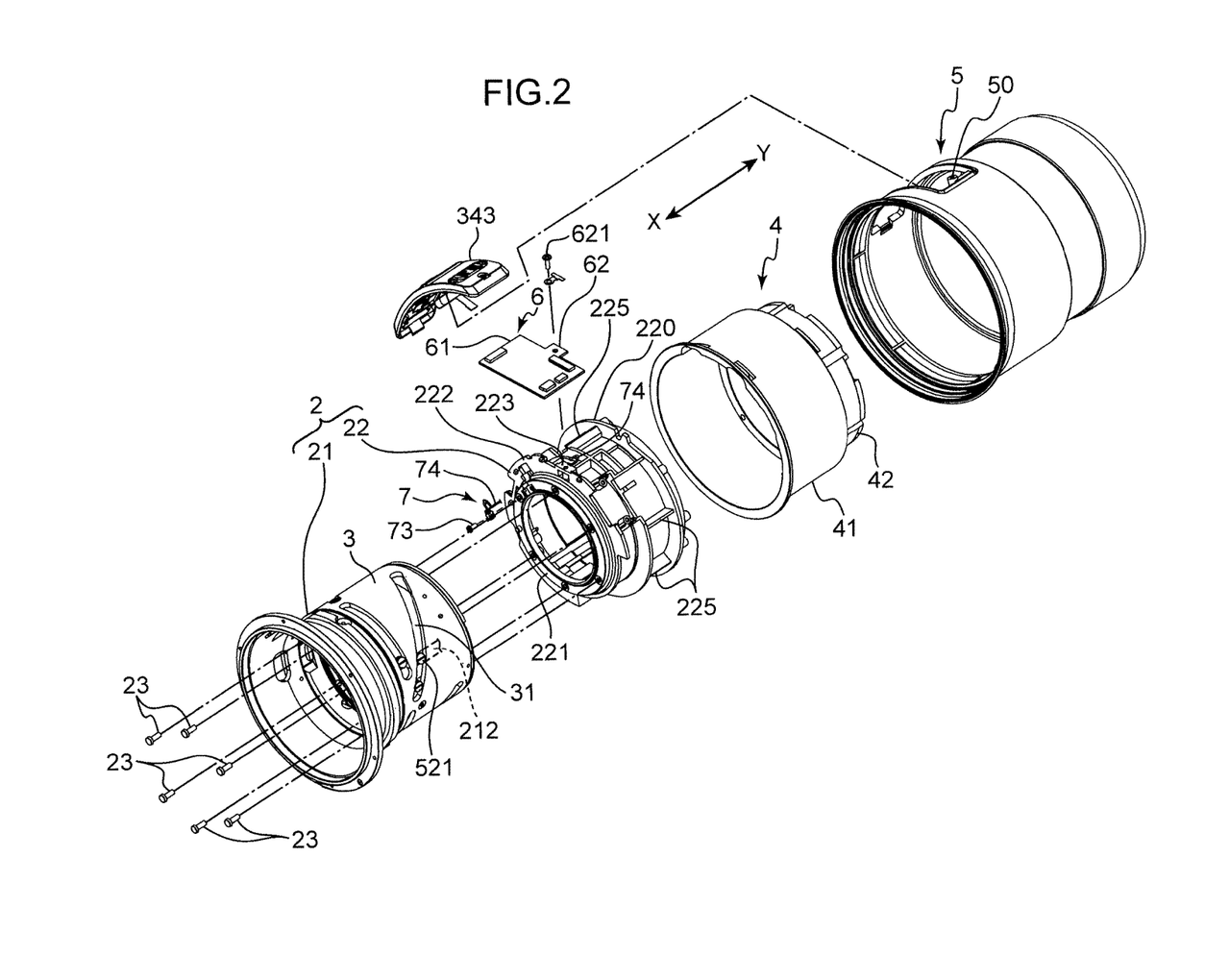
FIG. 2 is an exploded perspective view of an essential part of the lens barrel shown in FIG. 1.
Figure 3:
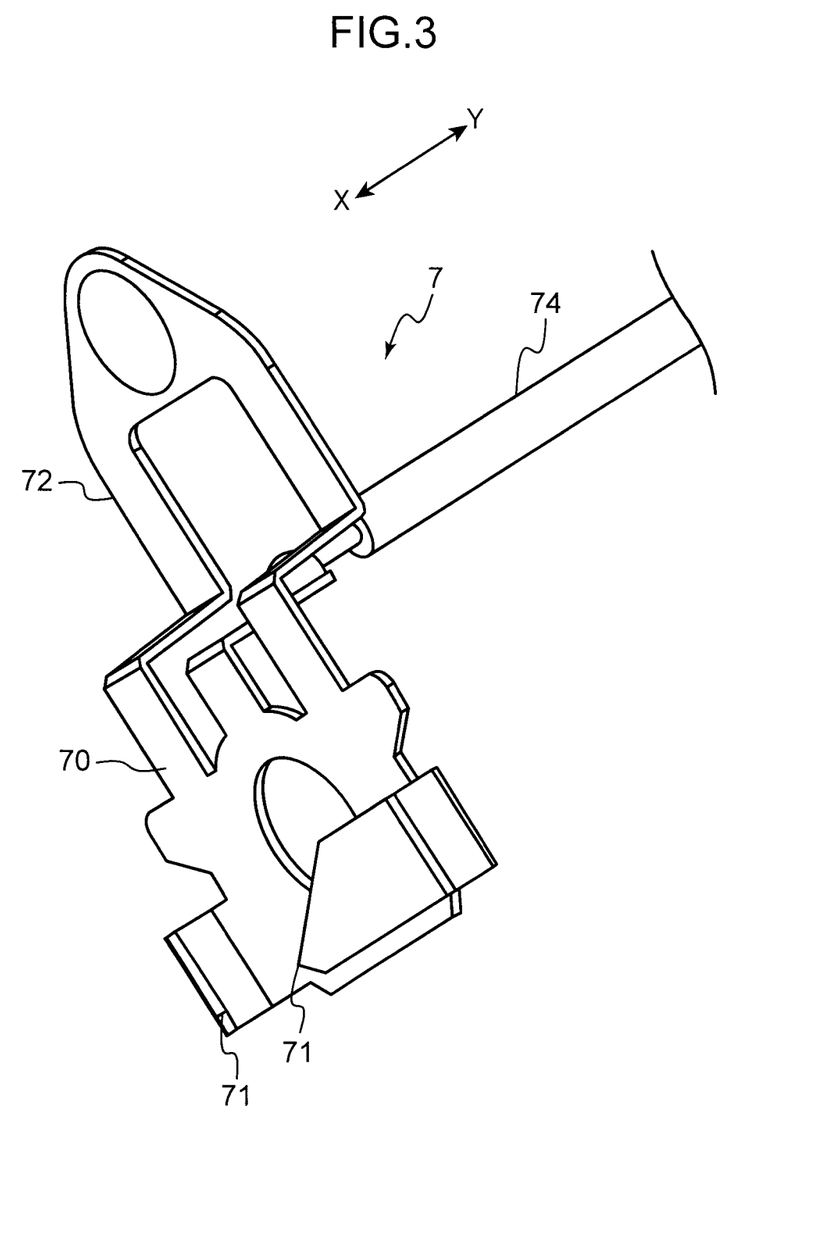
FIG. 3 is a perspective view of a conductive member used in the lens barrel shown in FIG. 1.
Figure 4:
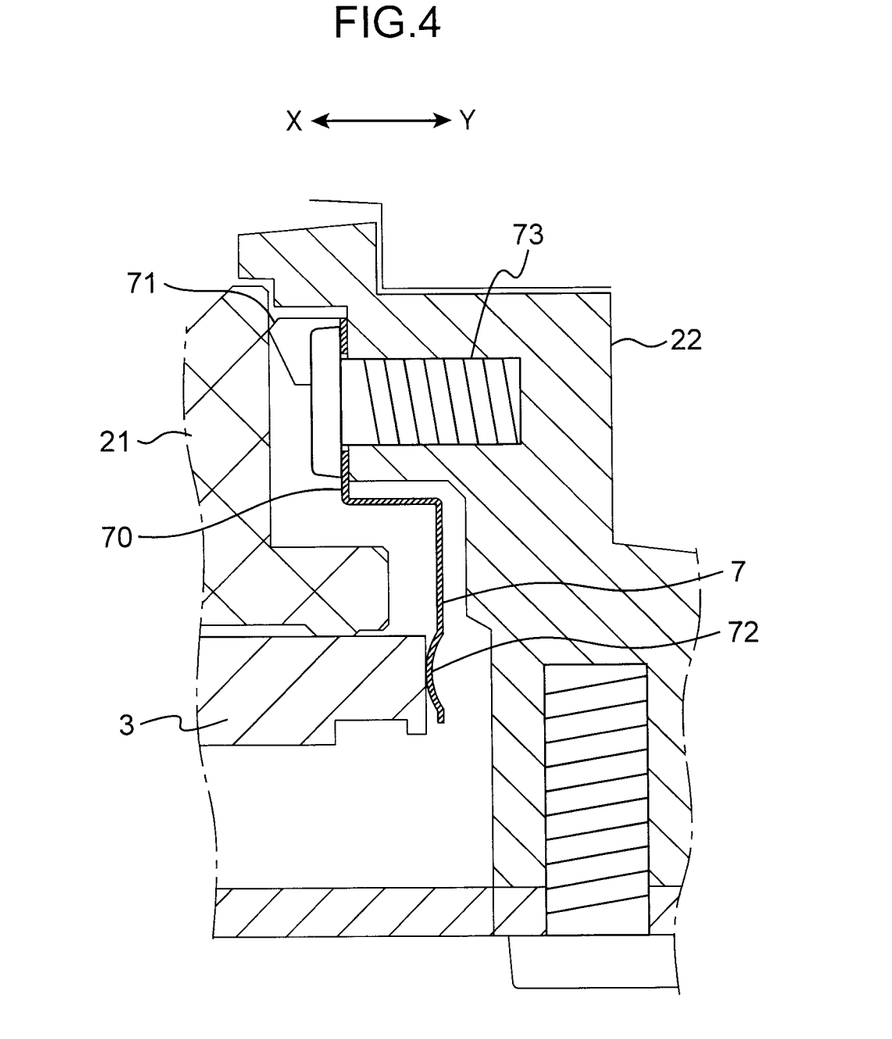
FIG. 4 is an enlarged sectional view of an essential part of the lens barrel shown in FIG. 1.
Figure 5:
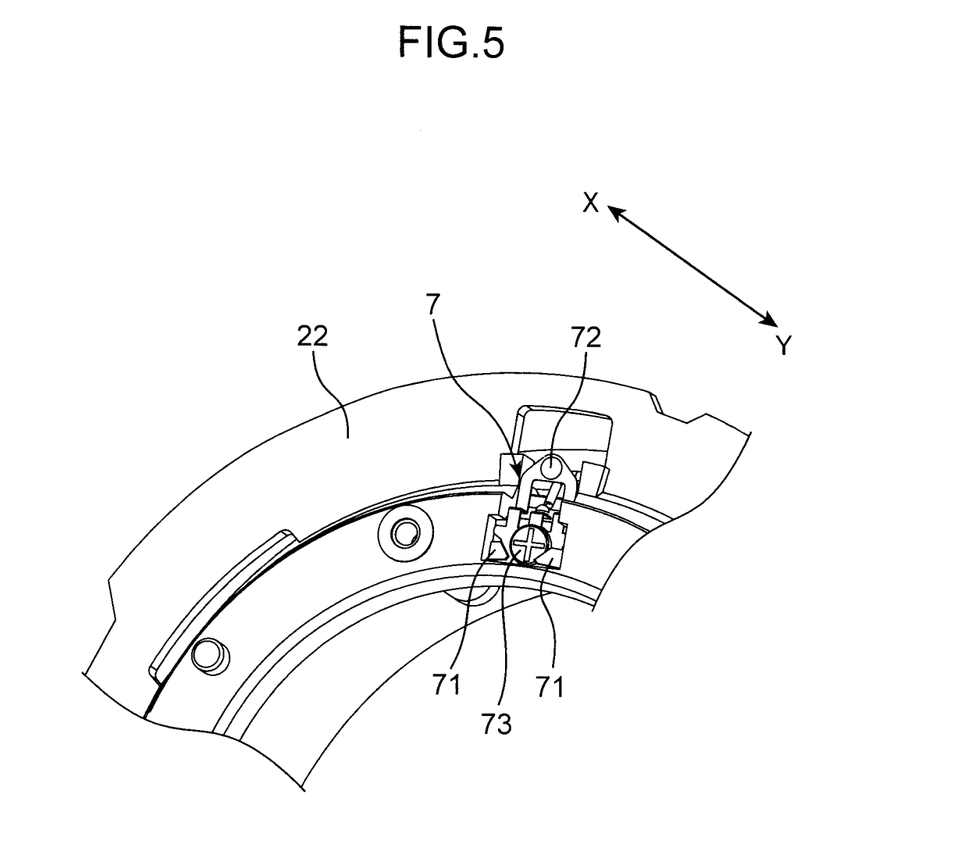
FIG. 5 is a partial perspective view of the lens barrel shown in FIG. 1 in a state where the conductive member is mounted on a second fixing cylinder.

FIG. 1 is a sectional view of a lens barrel in one embodiment. FIG. 2 is an exploded perspective view of an essential part of the lens barrel shown in FIG. 1. FIG. 3 is a perspective view of a conductive member used in the lens barrel shown in FIG. 1. FIG. 4 is an enlarged sectional view of an essential part of the lens barrel shown in FIG. 1. FIG. 5 is a partial perspective view of the lens barrel shown in FIG. 1 in a state where the conductive member is mounted on a second fixing cylinder. Note that, in the following description, an X-direction shown is a direction toward an object side and a Y-direction shown is a direction toward an image side.

The lens barrel 1 of this embodiment includes a fixing cylinder 2, lens groups 51 to 54, a cam cylinder 3, a reinforcing member 4 and an exterior member 5 as shown in FIG. 1.

The fixing cylinder 2 includes a hollow cylindrical first fixing cylinder 21 made of metal and a hollow cylindrical second fixing cylinder 22 made of synthetic resin and fixedly coupled to an image-side end part of the first fixing cylinder 21.

The first fixing cylinder 21 includes a flange-like first coupling portion 211 projecting radially inwardly from the inner peripheral surface over the entire circumference on the image-side end part in an axial direction thereof. The first fixing cylinder 21 includes a guide groove 212 formed to extend along the axial direction and penetrate from the inner periphery to the outer periphery.

The second fixing cylinder 22 includes a first reinforcing member fitting portion 220 to be fitted to the reinforcing member 4 on an image-side end part in an axial direction thereof. The first reinforcing member fitting portion 220 is in the form of a flange projecting radially outwardly from the outer peripheral surface of the second fixing cylinder 22 substantially over the entire circumference.

The second fixing cylinder 22 includes a second coupling portion 221 coupled to the first coupling portion 211 and a second reinforcing member fitting portion 222 fitted to the reinforcing member 4 on an object-side end part in the axial direction thereof.

The second coupling portion 221 is in the form of a flange projecting radially inwardly from the inner peripheral surface over the entire circumference and facing the first coupling portion 211 in the axial direction of the first fixing cylinder 21. The second reinforcing member fitting portion 222 projects radially outwardly from the outer peripheral surface.

In this embodiment, the second fixing cylinder 22 includes a plurality of circumferentially extending ribs 225 for increasing the strength of the second fixing cylinder 22 between the first reinforcing member fitting portion 220 and the second reinforcing member fitting portion 222 as shown in FIG. 2. Each rib 225 extends from the first reinforcing member fitting portion 220 to the second reinforcing member fitting portion 222 along the axial direction of the second fixing cylinder 22.

A board (circuit board) 6 is mounted on the object-side end part of the second fixing cylinder 22 in the axial direction. This board 6 is, for example, for detecting a rotational position of the cam cylinder 3 relative to the first fixing cylinder 21 or controlling an autofocus drive motor 341 to be described later, includes a rectangular board main body 61 and a board mounting portion 62 mounted on the second fixing cylinder 22 and is connected to an electrical component such as the autofocus drive motor 341 on an unillustrated flexible printed board.

The board mounting portion 62 is formed to project toward the image side from the board main body 61. The board mounting portion 62 is fixedly mounted on a mounted portion 223 provided on the object-side end part of the second fixing cylinder 22 via a mounting bolt 621 so as to project toward the object side from the end part of the second fixing cylinder 22. This facilitates the arrangement of the board 6 adjacent to the reinforcing member 4 and, even if the reinforcing member 4 is cut for miniaturization, reduces the size of a cut and reduces a possibility of reducing the rigidity of the reinforcing member 4. An object-side end of the reinforcing member 4 projects radially outwardly and enhances the rigidity of a second fitted portion 412.

A conductive member 7 conductively connecting the first fixing cylinder 21 to ground is mounted on an object-side end surface of the second fixing cylinder 22 of this embodiment in the axial direction via a mounting bolt 73. The conductive member 7 of this embodiment includes a conductive member main body 70, contact portions 71 to be brought into contact with the first fixing cylinder 21 and an elastic cam cylinder biasing portion (an example of a biasing portion) 72 for biasing the cam cylinder 3 as shown in FIG. 3.

The contact portions 71 respectively project toward the object side from opposite side end parts of the conductive member main body 70, are formed to have a pointed tip and configured to reliably come into contact with the first fixing cylinder 21.

The conductive member 7 mounted on the second fixing cylinder 22 is connected to the ground of the board 6 via a lead wire 74 as shown in FIGS. 2 to 4.

The second coupling portion 221 of the second fixing cylinder 22 and the first coupling portion 211 of the first fixing cylinder 21 thus formed are fixedly coupled by bolts 23 from the object side. In this coupled state, the axial direction of the second coupling portion 221 and that of the first coupling portion 211 coincide and one fixing cylinder is formed by the first and second fixing cylinders 21, 22.

In this state, the contact portions 71 of the conductive member 7 are in contact with the first fixing cylinder 21 and the first fixing cylinder 21 is conductively connected to the ground of the board 6 as shown in FIG. 4. The board main body 61 of the board 6 is arranged radially outwardly of the first fixing cylinder 21 as shown in FIG. 1.

The lens groups include a first lens group 51, a second lens group 52, a third lens group 53 and a fourth lens group 54 successively arranged from the object side toward the image side as shown in FIG. 1 in this embodiment.

The first lens group 51 includes one or more lenses and is fixedly held in the first fixing cylinder 21.

The second lens group 52 includes one or more lenses, is held movably in an optical axis direction (X-Y direction, axial direction of the first fixing cylinder 21) in the first fixing cylinder 21 and constitutes a moving lens group. This second lens group 52 includes a guide shaft 521, which is inserted into the guide groove 212 of the first fixing cylinder 21 and a cam groove 31 of the cam cylinder 3 to be described, on an outer peripheral side, and moves in the optical axis direction by this guide shaft 521 being guided and moved along the guide groove 212 and the cam groove 31. Note that a movement of this lens group 52 is further described later.

The third lens group 53 includes one or more lenses and is fixedly held in the second fixing cylinder 22.

The fourth lens group 54 includes one or more lenses and is so held in the second fixing cylinder 22 that an inclination of the optical axis direction and a position in the optical axis direction can be adjusted by a plurality of adjusting bolts 541 (only one is shown in FIG. 1).

The cam cylinder 3 is for moving the lens group in the optical axis direction and, in this embodiment, moves the second lens group 52 in the optical axis direction. The cam cylinder 3 is formed of a hollow cylindrical body and includes the cam groove 31 into which the guide shaft 521 of the second lens group 52 is movably inserted as shown in FIGS. 1 and 2. This cam groove 31 is formed obliquely to the axial direction.

The thus formed cam cylinder 3 is so held on an outer peripheral side of a part of the image side of the first fixing cylinder 21 as to be immovable in the axial direction and rotatable about an optical axis (about an axis of the first fixing cylinder 21). Further, in this state, the cam cylinder 3 is conductively in contact with the cam cylinder biasing portion 72 so that the cam cylinder 3 is constantly biased toward the object side by the cam cylinder biasing portion 72. The cam cylinder 3 is rotated by a rotating member.

This rotating member includes a manual operating member 33, an autofocus operating member 34 and an output ring 35.

The autofocus operating member 34 includes the autofocus drive motor 341 held in the first fixing cylinder 21, an automatic input ring 342 interlockingly coupled to the autofocus drive motor (drive motor) 341 via a gear and an autofocus switch (an example of a switch member) 343 for switching a state between an operating state where the autofocus drive motor 341 can operate and an operation stop state where the autofocus drive motor 341 does not operate.

The autofocus drive motor 341 includes an output shaft 341b having a first gear 341a in this embodiment.

The automatic input ring 342 is a hollow cylindrical member. In this embodiment, the automatic input ring 342 includes a second gear 342a meshed with the first gear 341a of the output shaft 341b on the outer periphery. The automatic input ring 342 includes a first roller rolling portion 342b, on which rolling rollers 351b of the output ring 35 to be described later roll, on an image-side surface thereof.

The thus configured automatic input ring 342 is arranged rotatably about the axis of the first fixing cylinder 21 on the outer periphery of the first fixing cylinder 21.

The autofocus switch 343 is mounted on a switch mounting portion 50 of the exterior member 5 to be described later and can be externally operated.

The manual operating member 33 is for manually rotating the cam cylinder 3 and includes a manual input ring 331 and a manual operation ring 332 for operating the manual input ring 331. The manual input ring 331 is a member in the form of a ring plate and includes a second roller rolling portion 331a, on which the rolling rollers 351b of the output ring 35 to be described later roll, on an object-side surface thereof.

This manual input ring 331 is arranged rotatably about the axis of the first fixing cylinder 21 on an image side of the automatic input ring 342 while being at a predetermined distance from the automatic input ring 342.

The manual operating ring 332 is a hollow cylindrical member and includes an operating portion 332a formed of an integrally formed flange on an inner peripheral side. This operating portion 332a operates the manual input ring 331 via an input ring biasing spring 332c from the image side.

The output ring 35 is a hollow cylindrical member. Three (only one is shown in FIG. 1) interlocking members 351 held on the output ring 35 are attached to the output ring 35.

The interlocking members 351 are members for interlocking the output ring 35 and the automatic input ring 342 and interlocking the output ring 35 and the manual input ring 331 and each interlocking member 351 includes a roller shaft 351a and the rolling roller 351b rotatably supported on the roller shaft 351a.

The output ring 35 is fixedly coupled to the cam cylinder 3 by an unillustrated coupling member.

The thus configured output ring 35 is arranged rotatably about the axis of the first fixing cylinder 21 (about the optical axis) between the automatic input ring 342 and the manual input ring 331 in the axial direction of the first fixing cylinder 21 and on the outer peripheral side of the first fixing cylinder 21.

In this state, the rolling rollers 351b are arranged between the first roller rolling portion 342b of the automatic input ring 342 and the second roller rolling portion 331a of the manual input ring 331 and sandwiched in a pressed state by the input ring biasing spring 332c.

More specifically, the input ring biasing spring 332c formed of a corrugated ring-like spring between the manual operation ring 332 and the manual input ring 331 and the manual input ring 331 is biased toward the automatic input ring 342 on the object side by this input ring biasing spring 332c.

By this biasing force, the second roller rolling portion 331a of the manual input ring 331 presses the rolling rollers 351b. By this pressing, the rolling rollers 351b press the first roller rolling portion 342b of the automatic input ring 342. This causes the rolling rollers 351b to be sandwiched in a state where a specific biasing force is applied by the first and second roller rolling portions 342b, 331a.

In the case of moving the second lens group 52 by the autofocus operating member 34, the autofocus switch 343 is turned on. This causes a voltage to be applied from the board 6 to the autofocus drive motor 341 and, associated with that, the autofocus drive motor 341 operates.

According to this operation of the autofocus drive motor 341, the automatic input ring 342 meshed with the first gear 341a rotates. With this rotation, the rolling rollers 351b roll on the first roller rolling portion 342b. At that time, the rolling rollers 351b are sandwiched by the first roller rolling portion 342b and the second roller rolling portion 331a of the manual input ring 331 and the rotation of the manual input ring 331 is regulated by a biasing force of the input ring biasing spring 332c or the like. Thus, the rolling rollers 351b revolve around the first fixing cylinder 21 while rotating, whereby the output ring 35 holding the rolling rollers 351b rotates.

With the rotation of the output ring 35, the cam cylinder 3 rotates. By the rotation of the cam cylinder 3, the guide shaft 521 inserted to the guide grove 212 of the first fixing cylinder 21 and the cam groove 31 of the cam cylinder 3 moves in those grooves 212, 31, whereby the second lens group 52 moves in the optical axis direction of the first fixing cylinder 21.

On the other hand, the manual operation ring 332 is manually rotated with the autofocus switch 343 turned off. This causes the manual input ring 331 to rotate, whereby the rolling rollers 351b roll on the second roller rolling portion 331a. At that time, since the automatic input ring 342 sandwiching the rolling rollers 351b cannot rotate by being meshed with the autofocus drive motor 341, the rolling rollers 351b revolve around the first fixing cylinder 21 while rotating and the entire output ring 35 rotates. Then, in a manner similar to the above, the cam cylinder 3 rotates and the second lens group 52 can be driven in the optical axis direction of the first fixing cylinder 21. Note that the switch member is not limited to the one that switches the state between the operating state where the autofocus drive motor 341 can operate and the operation stop state where the autofocus drive motor 341 does not operate, and has only to switch the operating state of the lens barrel 1 and can be appropriately changed. For example, the lens barrel 1 may be provided with a blur correction unit and the switch member may switch a state between an operating state where the blur correction unit can operate and the operation stop state where the blur correction unit does not operate or switch the state between the operating state where the autofocus drive motor 341 can operate and the operating state where the blur correction unit can operate.

Next, the reinforcing member 4 is described. The reinforcing member 4 is such as for reinforcing the second fixing cylinder 22 made of synthetic resin and includes a second fixing cylinder accommodating portion 41 made of metal for substantially entirely accommodating the second fixing cylinder 22 and a mount member fixing portion 42 formed on an image side of the second fixing cylinder accommodating portion 41.

The second fixing cylinder accommodating portion 41 includes a first fitted portion 411 to which the first reinforcing member fitting portion 220 of the second fixing cylinder 22 is to be fitted, and the second fixed portion 412 to which the second reinforcing member fitting portion 222 of the second fixing cylinder 22 is to be fitted. The reinforcing member 4 and the second fixing cylinder 22 are fixed by unillustrated fixing bolts with the first reinforcing member fitting portion 220 of the second fixing cylinder 22 fitted to the first fixed portion 411 and the second reinforcing member fitting portion 222 of the second fixing cylinder 22 fitted to the second fixed portion 412.

The mount member fixing portion 42 is tubular and fixed to a mount member 11 provided on the lens barrel 1.

More specifically, the lens barrel 1 is provided with the mount member 11 to be detachably mounted to a camera main body. The mount member 11 is fixed to an image-side end surface of the mount member fixing portion 42 by a fixing bolt 43 with the image-side end surface of the mount member fixing portion 42 held in contact with the mount member 11.

Next, the exterior member 5 is described. The exterior member 5 is formed of a tubular body made of synthetic resin and includes the switch mounting portion 50 for mounting the autofocus switch 343 as shown in FIGS. 1 and 2. The switch mounting portion 50 is formed by an opening on a part of the peripheral surface of the exterior member 5.

The exterior member 5 is arranged to cover the outer peripheries of the reinforcing member 4 and the cam cylinder 3 and fixed to the reinforcing member 4 and the mount member 11 in fixing the reinforcing member 4 and the mount member 11 by the fixing bolt 43.

In that fixed state, the switch mounting portion 50 is arranged substantially at the same position as the board 6 in a circumferential direction of the first fixing cylinder 21 and outwardly of the board 6 in a radial direction of the first fixing cylinder 21. In that state, the autofocus switch 343 and the board 6 are electrically connected to the switch mounting portion 50. In this way, the autofocus switch 343 and the board 6 can be easily electrically connected.

Since the second fixing cylinder 22 is made of synthetic resin, the lens barrel 1 configured as described above is easily formed into a complicated shape during molding. This enables a mounting portion to which another constituent member is to be mounted to be formed on the second fixing cylinder 22 during the molding and eliminates the need for separate processing, wherefore the above lens barrel 1 is easily formed. Further, since the second fixing cylinder 22 can be easily formed with the mounting portion during the molding, the other constituent member can be arranged at a predetermined position without displacement and the above lens barrel 1 has high performance. Since the second fixing cylinder 22 is made of synthetic resin, the above lens barrel 1 can be reduced in weight.

Since the radially projecting first coupling portion of the first fixing cylinder 21 and the radially projecting second coupling portion of the second fixing cylinder 22 are coupled, the first and second fixing cylinders 21, 22 can be firmly coupled and fixed in the above lens barrel 1.

The above lens barrel 1 can reinforce the strength of the second fixing cylinder 22 made of synthetic resin by the reinforcing member 4. By arranging the reinforcing member 4 radially outwardly of the second fixing cylinder 22, a member mounted on the outer periphery of the second fixing cylinder 22 can be protected by the reinforcing member 4.

Since the reinforcing member fitting portions to be fitted to the inner periphery of the second fixing cylinder accommodating portion are respectively provided on the opposite axial end parts of the second fixing cylinder 22, the above lens barrel 1 can suppress the deflection of the second fixing cylinder 22 in the axial direction. More specifically, if an image side of a lens barrel is mounted on a camera main body and an axial direction of the lens barrel is horizontally arranged, for example, when an object side of the lens barrel is heavier than the image side, a downward acting force perpendicular to the axial direction is applied to the object side of the lens barrel and the lens barrel is easily deflected and deformed in the axial direction by that force. However, since the fitting portion on the object-side end part of the second fixing cylinder 22 is fitted to the inner periphery of the reinforcing member 4 in this embodiment, a deflection/deformation force applied to the second fixing cylinder 22 can be reduced by the reinforcing member 4 and the deflection of the second fixing cylinder 22 in the axial direction can be suppressed.

In the above lens barrel 1, a part of the board 6 is arranged radially outwardly of the rotary cam cylinder 3, and an arrangement space for the other member can be sufficiently taken and efficiently provided.

Since the switch member is arranged outwardly of the board 6 in the radial direction of the first fixing cylinder 21 and electrically connected to the board 6 in the above lens barrel 1, the switch member and the board are easily electrically connected and an assembling operation of the lens barrel 1 can be easily performed in a short time.

In the above lens barrel 1, the first fixing cylinder 21 can be grounded by the conductive member 7 mounted on the first or second fixing cylinder 21 or 22 and, even if static electricity is generated, it can be allowed to escape to the ground.

Since the conductive member 7 includes the biasing portion for constantly biasing the cam cylinder 3 toward one axial direction of the first fixing cylinder 21, the cam cylinder 3 can be constantly arranged at a fixed position relative to the first fixing cylinder 21 and the moving lens group 52 can be accurately moved by biasing the cam cylinder 3 toward the one axial side of the first fixing cylinder 21 by the biasing portion. Since the conductive member 7 includes the biasing portion, it is not necessary to provide a biasing member separately from the conductive member 7, the number of components of the above lens barrel 1 can be suppressed and a cost reduction can be realized while high performance is provided. By conductively bringing the cam cylinder 3 and the biasing portion into contact, the cam cylinder 3 can be grounded via the biasing portion.

Note that although the reinforcing member 4 is formed separately from the exterior member 5 in the above embodiment, there is no limitation to this mode. For example, the exterior member 5 may double as the reinforcing member 4 by fitting the first and second reinforcing member fitting portions 220, 222 of the second fixing cylinder 22 to the inner periphery of the exterior member 5 and an appropriate change can be made. Note that, in that case, the exterior member 5 is preferably made of metal.

Further, although the first coupling portion 211 of the first fixing cylinder 21 projects radially inwardly of the first fixing cylinder 21 and the second coupling portion 221 of the second fixing cylinder 22 projects radially inwardly of the second fixing cylinder 22 in the above embodiment, there is no limitation to this and an appropriate change can be made. For example, the first coupling portion 211 of the first fixing cylinder 21 may project radially outwardly of the first fixing cylinder 21 and the second coupling portion 221 of the second fixing cylinder 22 may project radially outwardly of the second fixing cylinder 22.

This specification discloses various aspects of technology as described above. Out of those, main technologies are summarized below.

A lens barrel according to one aspect includes a tubular first fixing cylinder holding a lens group having one or more lenses and a tubular second fixing cylinder fixedly coupled to one axial end part of the first fixing cylinder so that an axial direction thereof extends along that of the first fixing cylinder, and the second fixing cylinder is made of synthetic resin.

Since the second fixing cylinder is made of synthetic resin, such a lens barrel is easily formed into a complicated shape during molding. This enables, for example, a mounting portion to which another constituent member is to be mounted to be formed on the second fixing cylinder during the molding, separate processing is not necessary and the lens barrel is easily formed. Further, since the second fixing cylinder can be formed with the mounting portion during the molding, the other constituent member can be arranged at a predetermined position without displacement and the lens barrel has high performance. Since the second fixing cylinder is made of synthetic resin, the lens barrel can be reduced in weight.

In another aspect, in the above lens barrel, the first fixing cylinder includes a first coupling portion projecting radially of the first fixing cylinder on the one axial end part of the first fixing cylinder, the second fixing cylinder includes a second coupling portion coupled to the first coupling portion and the second coupling portion projects radially of the second fixing cylinder to face the first coupling portion in the axial direction of the first fixing cylinder.

In such a lens barrel, the first and second fixing cylinders can be firmly coupled and fixed by the first coupling portion and the second coupling portion made of synthetic resin.

In another aspect, these above lens barrels further include a reinforcing member for reinforcing the second fixing cylinder and the reinforcing member includes a second fixing cylinder accommodating portion for accommodating the second fixing cylinder.

In such a lens barrel, the strength of the second fixing cylinder made of synthetic resin can be reinforced by the reinforcing member. By arranging the reinforcing member radially outwardly of the second fixing cylinder, a member mounted on the outer periphery of the second fixing cylinder can be protected by the reinforcing member in the above lens barrel.

In another aspect, in the above lens barrel, the second fixing cylinder accommodating portion has a substantially tubular shape and the second fixing cylinder includes reinforcing member fitting portions to be fitted to the inner periphery of the fixing cylinder accommodating portion respectively on opposite axial end parts of the second fixing cylinder.

In such a lens barrel, the deflection of the second fixing cylinder in the axial direction can be suppressed. More specifically, if an image side of a lens barrel is mounted on a camera main body and an axial direction of the lens barrel is horizontally arranged, for example, when an object side of the lens barrel is heavier than the image side, a downward acting force perpendicular to the axial direction is applied to the object side of the lens barrel and the lens barrel is easily deflected and deformed in the axial direction by that force. However, since the fitting portion on the object-side end part of the second fixing cylinder is fitted to the inner periphery of the reinforcing member, a deflection/deformation force applied to the second fixing cylinder can be reduced by the reinforcing member and the deflection of the second fixing cylinder in the axial direction can be suppressed.

In another aspect, these above lens barrels further include a cam cylinder rotatably held on the outer periphery of the first fixing cylinder and a board mounted on the second fixing cylinder, the lens group includes a moving lens group held on an inner peripheral side of the first fixing cylinder movably in the axial direction of the first fixing cylinder, the cam cylinder moves the moving lens group in the axial direction of the first fixing cylinder in rotating relative to the first fixing cylinder, and a part of the board is arranged radially outwardly of the cam cylinder.

Since the part of the board is arranged radially outwardly of the cam cylinder in such a lens barrel, an arrangement space for another member can be sufficiently taken and efficiently provided.

In another aspect, the above lens barrel further includes a switch member for switching an operating state of the lens barrel, and the switch member is arranged outwardly of the board in a radial direction of the first fixing cylinder and electrically connected to the board.

In such a lens barrel, the switch member and the board are easily electrically connected and an assembling operation of the lens barrel can be easily performed in a short time.

In another aspect, these above lens barrels further include a conductive member mounted on the first or second fixing cylinder, the first fixing cylinder is made of metal and the conductive member is arranged in contact with the first fixing cylinder to conductively ground the first fixing cylinder.

In such a lens barrel, the first fixing cylinder can be grounded even if the second fixing cylinder is made of synthetic resin and, even if static electricity is generated, it can be allowed to escape to ground.

In another aspect, the above lens barrel further includes a cam cylinder rotatably held on the outer periphery of the first fixing cylinder and the conductive member includes a biasing portion for constantly biasing the cam cylinder toward the one axial side of the first fixing cylinder.

In such a lens barrel, the cam cylinder can be constantly arranged at a fixed position relative to the first fixing cylinder and the moving lens group can be accurately moved by biasing the cam cylinder toward the one axial side of the first fixing cylinder by the biasing portion. Since the conductive member includes the biasing portion, it is not necessary to provide a biasing member separately from the conductive member, the number of components of the lens barrel can be suppressed and a cost reduction can be realized while high performance is provided. By conductively bringing the cam cylinder and the biasing portion into contact, the cam cylinder can be grounded via the biasing portion.

This application is based on Japanese Patent Application No. 2014-254084 filed on Dec. 16, 2014, the contents of which are hereby incorporated by reference.

To express the present invention, the present invention has been appropriately and sufficiently described through the embodiment with reference to the drawings above. However, it should be recognized that those skilled in the art can easily modify and/or improve the embodiment described above. Therefore, it is construed that modifications and improvements made by those skilled in the art are included within the scope of the appended claims unless those modifications and improvements depart from the scope of the appended claims.

The invention claimed is:

1. A lens barrel, comprising:
   a tubular first fixing cylinder which holds a lens group having one or more lenses at an object side in an optical axis direction of the lens group; and
   a tubular second fixing cylinder which holds another lens group having one or more lenses at an image side in the optical axis direction with respect to the lens group held by the first fixing cylinder, and is fixedly coupled to one axial end part of the first fixing cylinder so that an axial direction thereof extends along that of the first fixing cylinder,
   wherein the first fixing cylinder is made of metal, and
   wherein the second fixing cylinder is made of synthetic resin,
   the lens barrel further comprising a conductive member mounted on the first or second fixing cylinder,
   wherein the conductive member is arranged in contact with the first fixing cylinder to conductively ground the first fixing cylinder,
   the lens barrel further comprising a cam cylinder rotatably held on the outer periphery of the first fixing cylinder,
   wherein the conductive member includes a biasing portion for constantly biasing the cam cylinder toward the one axial side of the first fixing cylinder.

2. The lens barrel according to claim 1,
   wherein the first fixing cylinder includes a first coupling portion projecting radially of the first fixing cylinder on the one axial end part of the first fixing cylinder, wherein the second fixing cylinder includes a second coupling portion coupled to the first coupling portion, and wherein the second coupling portion projects radially of the second fixing cylinder to face the first coupling portion in the axial direction of the first fixing cylinder.

3. The lens barrel according to claim 1, further comprising a reinforcing member for reinforcing the second fixing cylinder, wherein the reinforcing member includes a second fixing cylinder accommodating portion for accommodating the second fixing cylinder.

4. The lens barrel according to claim 3, wherein the second fixing cylinder accommodating portion has a substantially tubular shape, and wherein the second fixing cylinder includes reinforcing member fitting portions to be fitted to the inner periphery of the fixing cylinder accommodating portion respectively on opposite axial end parts of the second fixing cylinder.

5. The lens barrel according to claim 1, further comprising a cam cylinder rotatably held on the outer periphery of the first fixing cylinder and a board mounted on the second fixing cylinder, wherein the lens group includes a moving lens group held on an inner peripheral side of the first fixing cylinder movably in the axial direction of the first fixing cylinder, wherein the cam cylinder moves the moving lens group in the axial direction of the first fixing cylinder in rotating relative to the first fixing cylinder, and wherein a part of the board is arranged radially outwardly of the cam cylinder.

6. The lens barrel according to claim 5, further comprising a switch member for switching an operating state of the lens barrel, wherein the switch member is arranged outwardly of the board in a radial direction of the first fixing cylinder and electrically connected to the board.

7. A lens barrel, comprising:

a tubular first fixing cylinder holding a lens group having one or more lenses;

a tubular second fixing cylinder fixedly coupled to one axial end part of the first fixing cylinder so that an axial direction thereof extends along that of the first fixing cylinder;

a conductive member mounted on the first or second fixing cylinder; and a cam cylinder rotatably held on the outer periphery of the first fixing cylinder, wherein the second fixing cylinder is made of synthetic resin, wherein the first fixing cylinder is made of metal, wherein the conductive member includes a biasing portion for constantly biasing the cam cylinder toward the one axial side of the first fixing cylinder, and wherein the conductive member is arranged in contact with the first fixing cylinder to conductively ground the first fixing cylinder.

* * * * *